United States Patent
Blohm

(10) Patent No.: US 11,609,548 B2
(45) Date of Patent: Mar. 21, 2023

(54) CLOUD-BASED MANAGEMENT OF 3D PRINTERS THROUGH LOAD BALANCING

(71) Applicant: Nicole Blohm, Mount Pleasant, SC (US)

(72) Inventor: Nicole Blohm, Mount Pleasant, SC (US)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 17/115,585

(22) Filed: Dec. 8, 2020

(65) Prior Publication Data

US 2022/0179395 A1 Jun. 9, 2022

(51) Int. Cl.
*G06F 3/12* (2006.01)
*G05B 19/4099* (2006.01)
*B33Y 50/00* (2015.01)

(52) U.S. Cl.
CPC .......... *G05B 19/4099* (2013.01); *B33Y 50/00* (2014.12); *G06F 3/12* (2013.01); *G06F 3/122* (2013.01); *G06F 3/126* (2013.01); *G06F 3/1285* (2013.01); *G05B 2219/49023* (2013.01); *G06F 3/1297* (2013.01); *G06F 2206/1508* (2013.01)

(58) Field of Classification Search
None
See application file for complete search history.

(56) References Cited

U.S. PATENT DOCUMENTS

| 9,827,714 | B1* | 11/2017 | Ruxton | G06Q 30/0621 |
| 2014/0309765 | A1* | 10/2014 | Blanchfield, Jr. | B29C 64/386 |
| | | | | 703/1 |
| 2016/0042255 | A1* | 2/2016 | Ganesh | G06K 15/02 |
| | | | | 358/1.15 |
| 2019/0139178 | A1* | 5/2019 | Cook | G06T 1/0021 |
| 2019/0361427 | A1* | 11/2019 | Chanin | G06F 3/1285 |

* cited by examiner

*Primary Examiner* — Haris Sabah
(74) *Attorney, Agent, or Firm* — Hickman Becker Bingham Ledesma LLP

(57) ABSTRACT

An approach is provided for managing 3D printing processes using a 3D printing management service in a cloud-based environment. Configuration data is received corresponding to one or more available 3D printing devices which may be used to complete a 3D printing job. Build data is received corresponding to one or more 3D printing jobs requested for the one or more available 3D printing devices. The 3D printing management service utilizes the configuration data and the build data to select at least a particular 3D printing device to perform at least a particular 3D printing job based on a resourced load balancing determination. The build data is transformed to a format communicable to the particular selected 3D printer to allow it to perform the particular 3D printing job.

20 Claims, 10 Drawing Sheets

CLOUD-BASED MANAGEMENT OF 3D PRINTERS THROUGH LOAD BALANCING

FIELD OF THE DISCLOSURE

The technical field of the present disclosure relates to improved methods, systems, computer software, and/or computer hardware in the field of 3D printing. The disclosure relates more specifically to improved computer-implemented methods and systems for managing and controlling 3D printing operations through load balancing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

3D printing and additive manufacturing are increasingly ubiquitous technologies in many fields of industry. However, contemporary systems of 3D printing rely on a user connecting directly to a 3D printer to begin and end operations. 3D printers are often controlled directly by a user using computer memory physically inserted into a printed circuit board or physically wiring the printer directly to another device controlling device. This method of 3D printing is extremely tedious and resource intensive to a user, as more 3D printing devices are needed to complete one or more complex printing jobs. Users may only have the ability to control the physical operations of the printers themselves and lack any ability to balance resource loads of printing jobs in typical printing operations. Users typically do not have the expertise or infrastructure to manage large volumes of printing efficiently.

Third-party printing services and farms lack the necessary context to efficiently complete the jobs specified by a client, especially when the information is conveyed informally by human operators. Outsource printing to a third-party company with large infrastructures requires users to provide files manually to the companies and convey the parameters of their printing jobs to human operators. User's must then hope that these third parties fulfill their jobs as closely to the parameters as possible with little control. The inability to manage 3D printing processes from user to printer creates wasteful time lag and resource mismanagement.

SUMMARY

In an embodiment, a computer-implemented method comprises: receiving device configuration data for a plurality of 3D printing devices; receiving build data corresponding to one or more 3D printing processes; selecting, based on the device configuration data and the build data, at least a particular 3D printing device of the plurality of 3D printing devices to perform a particular 3D printing process of the one or more 3D printing processes; and transforming a subset of the build data into particular build instructions for the particular 3D printing device, the particular build instructions executable by the particular 3D printing device to perform at least the particular 3D printing process. The approach may also be implemented via execution of instructions stored on one or more computer-readable media or an apparatus.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. OVERVIEW
2. EXAMPLE COMPUTING ENVIRONMENTS AND COMPONENTS
3. EXAMPLE PROCESSES FOR 3D PRINTER MANAGEMENT
4. EXAMPLE EMBODIMENTS
   4.1. CLIENT INTERFACES
   4.2. PRESET CONFIGURATIONS
   4.3. JOB MANAGEMENT
   4.4. PRINTER MAINTENANCE
   4.5. RESOURCE LOAD BALANCING
   4.6. SUPPLY CHAIN INTEGRATION
   4.7. DIGITAL WAREHOUSING
5. HARDWARE, SOFTWARE AND CLOUD COMPUTING EXAMPLES
   5.1 HARDWARE EXAMPLE
   5.2 SOFTWARE EXAMPLE
   5.3 CLOUD COMPUTING EXAMPLE

1. Overview

In various embodiments, a computer-implemented service connects, using a cloud-based networking infrastructure, one or more client computing devices for requesting 3D printing jobs and one or more 3D printing devices for performing those jobs. The service receives, as input, computer-readable build data that specifies one or more printing jobs relating to potential physical 3D printed objects sought by a client or user. The service utilizes the received computer-readable build data to select one or more known 3D printing devices connectively coupled to the service to perform the job(s) specified by the computer-readable build data. Based on the selection of the known 3D printing devices, the service transforms or creates new computer-readable data corresponding to instructions that will be executable by the one or more selected 3D printers to additively manufacture the potential physical 3D printed objects.

Technical benefits of the methods and systems described herein include improved computer, system, and printer efficiency by shifting multiple aspects of printer operations away from the user and the print farm or cell. This decreases the time and computing resources required for clients and print cell operators to perform printing jobs and allocates efficient use of printer resources by balancing resource loads through an integrated cloud-based service. The inefficiency of multiple individual parties to a complex print job is reduced while the process itself is automated in a computer-implemented service from the start of the operation to the end. Moreover, the computer-implemented service allows for easier and more intuitive operation by decoupling clients and print cell managers from processes, eliminating informal human communication, and allowing for real-time and continuous management of printing operations to ensure a more efficient and smooth flow of print jobs to a print cell.

2. Example Computing Environments and Components

Figure 1:
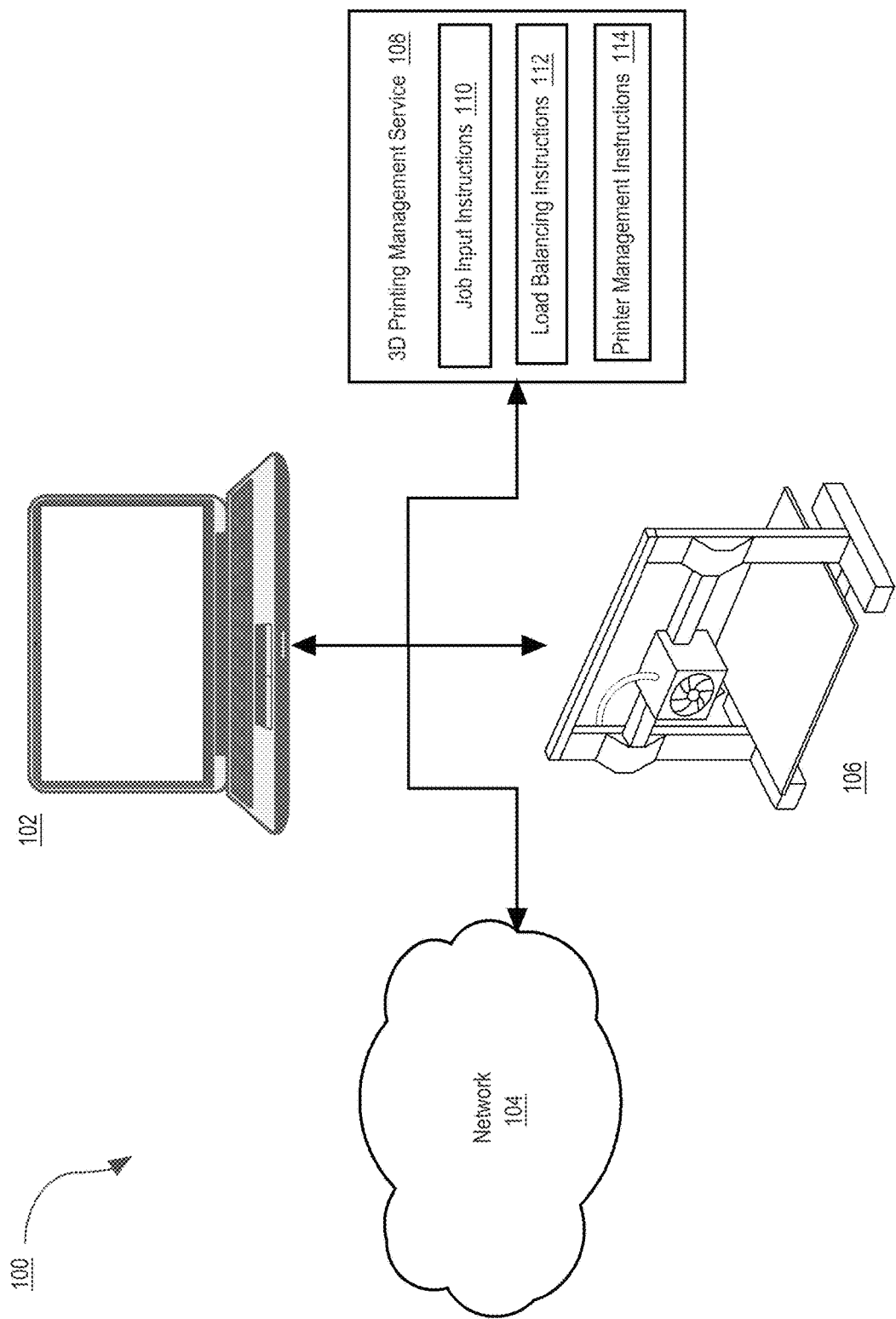
FIG. 1 depicts an example networked computer system.

FIG. 1 depicts an example networked computer system 100. FIG. 1 is shown in simplified, schematic format for purposes of depicting a clear example and other embodiments may include more, fewer, or different elements. The system depicted in FIG. 1 includes a networked computer system for facilitating a 3D printing service according to various embodiments. The networked computer system 100 includes a client device 102. The client device 102 may be any client device or entity from which 3D printing job information may be received. For example, the client device 102 may be a laptop computer with network access from which data can be sent and received and an interface and input mediums such as a digital screen, keyboard, and trackpad.

The networked computer system further includes a network 104. The network 104 may be any network or connective entity from which electronic signals and/or data can be sent and received. For example, network 104 may be an internet, intranet, local area network, wired connection, wireless connection, cloud-based network, or any other medium through which the embodiments described herein may be practiced.

The networked computer system 100 further includes a 3D printer 106. The 3D printer 106 may be any additive manufacturing device capable of utilizing digital input to create an output of a manufactured physical object. Any additive manufacturing or 3D printing device may be represented by the 3D printer 106, including, but not limited to, device utilizing fused deposition modeling (FDM), stereolithography (SLA), selective laser sintering (SLS) direct beam laser sintering (DMLS), electron beam melting (EMB), multi jet fusion (MJF), and/or polyjet manufacturing (PJM). For example, the 3D printer 106 may be a device utilizing FDM to turn raw plastic materials fed into the machine into a manufactured physical 3D plastic object using computer instructions.

The networked computer system 100 further includes a 3D printing management service 108. The 3D printing management service 108 may be any service or entity that is utilized as part of the 3D printing processes and systems described herein. In various embodiments, the 3D printing management service 108 is a cloud-implemented service communicatively coupled to a 3D printing device such as the 3D printer 106 and a client device such as the client device 102 in order to facilitate 3D printing operations. The service may contain a number of modules or instructions for facilitating the operations of the service to improve 3D printing processes. For example, the 3D printing management service 108 may include one or more computer-based instructions for executing a method or process for managing 3D printing operations from client device to 3D printer.

As depicted in FIG. 1, the 3D printing management service 108 includes job input instructions 110. Job input instructions 110 may be any set of instructions or computer-readable code which, when executed, cause the 3D printing management service 108 to receive and manage input from a client device such as the client device 102. These instructions, when executed, may cause facilitating processes such as generating a user interface, providing listings of available 3D printing devices, receiving input from a client device, interpreting client specifications or configurations for print jobs, or any other process involving management, storing of, or processing 3D print operations using one or more interfaces.

The 3D printing management service 108 includes load balancing instructions 112. Load balancing instructions 112 may be any set of instructions or computer-readable code which, when executed, cause the 3D printing management service 108 to interpret and analyze job and printer data and generate/select optimized printing job processes for improving efficient utilization of printing resources. These instructions, when executed, may cause facilitating processes such as transforming received client data, aggregating known available 3D printer devices, algorithmically determining a resource load on each known printer, selecting a set of printers for completing a job based on one or more attributes of the printers, transforming data into printing device-readable code, or any other process involving resource management or printer selection based on resource constraints.

The 3D printing management service 108 includes printer management instructions 114. Printer management instructions 114 may be any set of instructions or computer-readable code which, when executed, cause the 3D printing management service 108 to manage and update information relating to the status and availability of printing devices in a print cell. These instructions, when executed, may cause facilitating processes such as tracking the connectivity of printing devices, tracking the job status of printing devices, tracking the physical boundaries and configurations of printers, managing the start and end of print jobs, or any other process involving detection, management, configuration, physical alteration, or manipulation of physical 3D printing devices.

Figure 2:
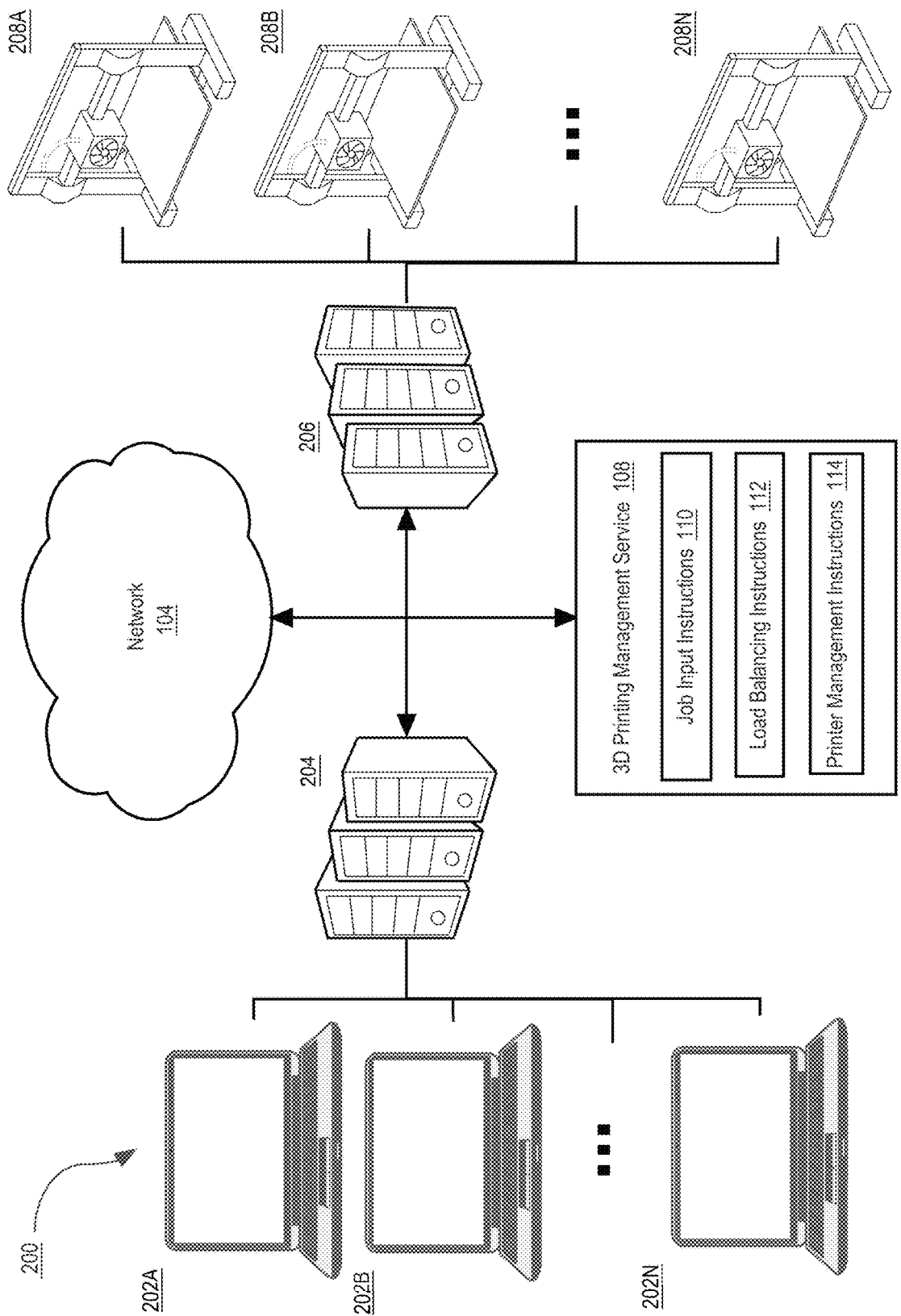
FIG. 2 depicts an example networked server system.

FIG. 2 depicts an example networked server system 200. FIG. 2 is shown in simplified, schematic format for purposes of illustrating a clear example and other embodiments may include more, fewer, or different elements. The networked server system 200 includes a network 104 and a 3D printing management service 108 comprising the instructions described herein with respect to FIG. 1.

The networked server system 200 further includes one or more networked client devices 202A-202N. In various embodiments, networked client devices 202A-202N include any client devices or entities from which 3D printing job information may be received. For example, each of networked client devices 202A-202N may be capable of generating input in response to a service-generated interface in order to begin a 3D printing process by requesting the initiation of a print job. The networked server system 200 further includes a client server 204. The client server 204 may be any server, software, and/or hardware entity that is communicatively connected to one or more of networked client devices 202A-202N. The client server 204 may facilitate data transfer to and from each of the networked client devices 202A-202N on an individual device basis. For example, the client server 204 may receive information such as a cloud-based interface meant for networked client device 202B and may facilitate the transfer of that data to networked client device 202B. As a further example, the client server 204 may receive, from networked client device 202N, build data relating to a request for a 3D print job to be performed by a 3D printing device. The client server may then pass the build data to the 3D printing management service 108 through the network 104.

Networked server system 200 includes a print server 206. The print server 206 may be any server, software, and/or hardware entity that is communicatively connected to one or more of 3D printing devices as a part of a print cell. The print server 206 may facilitate data transfer to and from each of 3D printing devices on an individual device basis. For example, the print server 206 may receive information such as device-specific G-CODE instructions which are designed to be executed by a specific 3D printing device to manufacture a physical object and facilitate transfer of that G-CODE to the proper specific 3D printing device. As a further example, the print server 206 may receive, from a specific 3D printing device, information relating to the current elapsed time of a print job being executed by the specific 3D printing device. The print server may then pass the elapsed time data to the 3D printing management service 108 through the network 104.

The networked server system 200 includes one or more networked 3D printers 208A-208N, which are communicatively coupled to print server 206. The networked 3D printers 208A-208N include a print cell that is available for one or more print jobs as requested by clients. In various embodiments, the print server 206 facilitates information to and from 3D printers 208A-208N as described herein.

Figure 3:
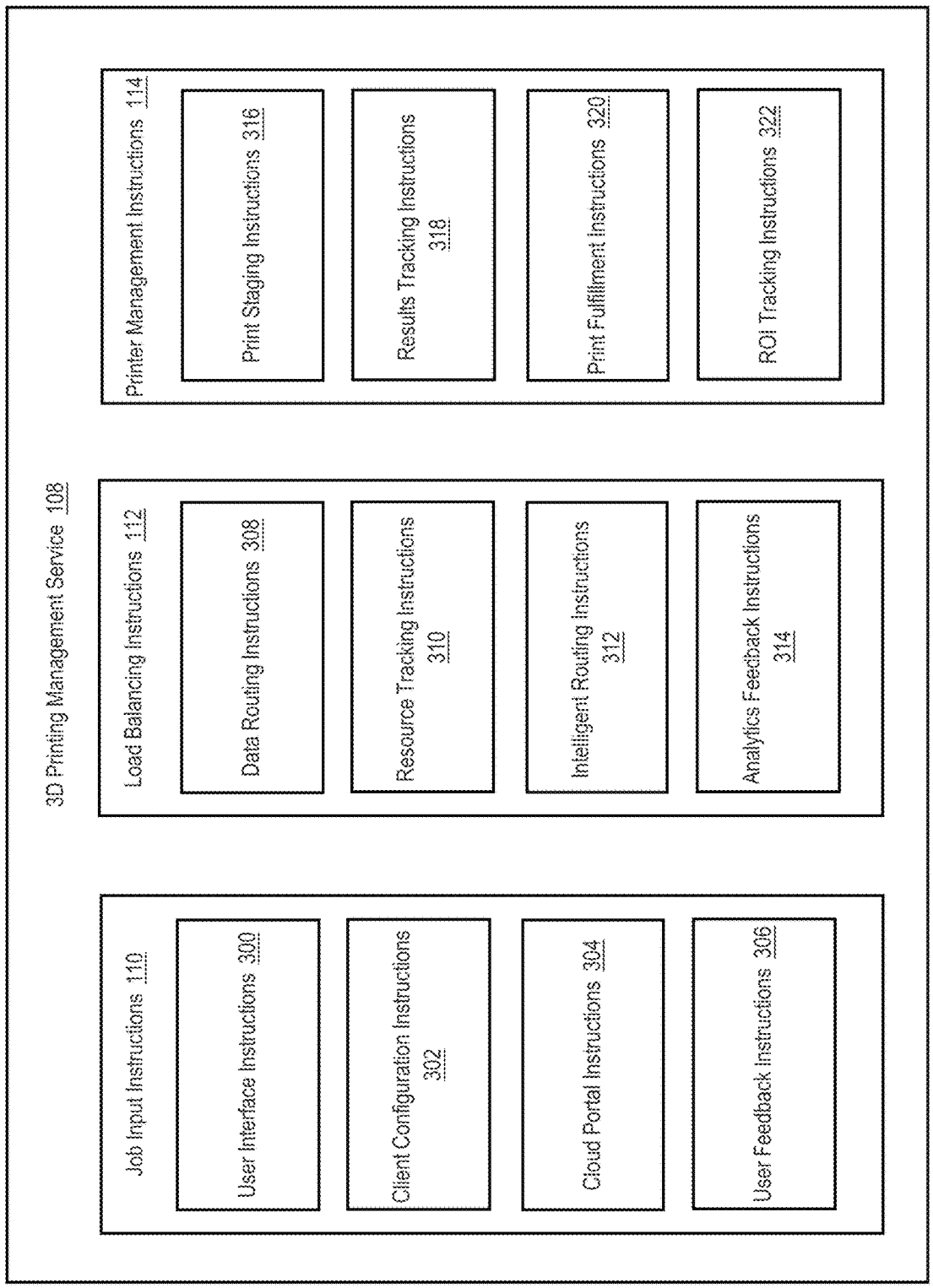
FIG. 3 depicts an example 3D printing management service.

FIG. 3 depicts an example 3D printing management service. FIG. 3 is shown in simplified, schematic format for purposes of illustrating a clear example and other embodiments may include more, fewer, or different elements. FIG. 3 depicts an expanded view of the 3D printing management service 108 and the instructions comprised therein according to various embodiments. Instructions that are part of the 3D printing management service 108 may further include one or more sub-instructions for executing specific methods or processes as part of a 3D printing operation. For example, as depicted in FIG. 3, the 3D printing management service 108 includes job input instructions 110, load balancing instructions 112, and printer management instructions 114 as described herein, and each set of instructions contains multiple sub-instructions which may be performed as part of those instructions.

The job input instructions 110 may comprise user interface instructions 300. In various embodiments, user interface instructions 300 are instructions which, when executed by a computing device, cause the computing device to display a user interface facilitated by the 3D printing management service through which job input instructions may be received via a cloud-based interface. For example, the 3D printing management service 108 may generate a cloud-based user interface that will accept input comprising client-specified parameters for a 3D printing job.

The job input instructions 110 may comprise client configuration instructions 302. In various embodiments, client configuration instructions 302 are instructions which, when executed by a computing device, cause the computing device to accept and modify client-input configuration instructions as part of a 3D print job. For example, the 3D printing management service 108 may execute client configuration instructions 302 to cause the 3D printing management service 108 to prompt a client device user for input regarding configurations of objects or resources to be used in facilitating a print job, such as a type of printing material, a print material color, a presence of support material during the printing operation, a speed or resolution of the printing operation, or any other parameter/configuration that may be relevant to a 3D printing operation.

The job input instructions 110 may comprise cloud portal instructions 304. In various embodiments, cloud portal instructions 304 are instructions which, when executed by a computing device, cause the computing device to create, maintain, and facilitate a cloud-based portal for exchange of data between the 3D printing management service 108 and a client device. For example, the 3D printing management service 108 may execute cloud portal instructions 304 to cause the 3D printing management service 108 to open and maintain a network connection between a client device and the 3D printing management service through which data and information relevant to potential printing operations may be passed.

The job input instructions 110 may comprise user feedback instructions 306. In various embodiments, user feedback instructions 306 are instructions which, when executed by a computing device, cause the computing device to prompt for and receive feedback from a client device or user related to a 3D printing process. For example, the 3D printing management service 108 may execute user feedback instructions 306 to cause the 3D printing management service 108 to receive information from a user of a client device which may alter an ongoing/future 3D printing operation. As a further example, a user may request cancelation of a 3D printing job or may provide retroactive feedback on the quality of a print job to improve facilitation of the 3D printing management service 108 through a client device.

The load balancing instructions 112 may comprise data routing instructions 308. In various embodiments, data routing instructions 308 are instructions which, when executed by a computing device, cause the computing device to route data and facilitate the transfer of information between entities, including any of the entities identified herein, including in FIGS. 1 and 2. For example, the 3D printing management service 108 may execute data routing instructions 308 to cause the 3D printing management service 108 to communicate with client server 204 and print server 206 to continuously receive build data from one or more client devices, transform the data, and send the transformed data to one or more 3D printing devices.

The load balancing instructions 112 may comprise resource tracking instructions 310. In various embodiments, resource tracking instructions 310 are instructions which, when executed by a computing device, cause the computing device to track the resource expenditure and bandwidth of various resources in a print facilitation system. For example, the 3D printing management service 108 may execute resource tracking instructions 310 to cause the 3D printing management service 108 to receive data from the various entities described herein and generate metrics that are used by the 3D printing management service 108 to improve load balancing operations. As a further example, resource tracking instructions 310 may be used to determine the total amount of build data incoming from client devices and the aggregate resource expenditure of each printing device in a print cell in order to quantify data relating to total resource bandwidth in a print management system.

The load balancing instructions 112 may comprise intelligent routing instructions 312. In various embodiments, intelligent routing instructions 312 are instructions which, when executed by a computing device, cause the computing device to efficiently transform and route information vital to 3D printing processes to necessary entities. For example, the 3D printing management service 108 may execute resource intelligent routing instructions 312 to cause the 3D printing management service 108 to determine a specific 3D printer in a print cell that will be used to perform a particular print job. The intelligent routing instructions 312 may then cause the 3D printing management service 108 to transform build data from a client device into machine-readable instructions for the specific 3D printer and route the transformed build data through a network port such as print server 206 and directly to the specific 3D printer to begin the print job.

The load balancing instructions 112 may comprise analytics feedback instructions 314. In various embodiments, analytics feedback instructions 314 are instructions which, when executed by a computing device, cause the computing device to provide machine learning capabilities to the 3D printing management service 108. For example, the 3D printing management service 108 may execute analytics feedback instructions 314 to cause the 3D printing management service 108 to collect feedback data from client devices and print cells to determine discrepancies between expected and actual print job resource expenditure. In a further example, the 3D printing management service 108 may execute analytics feedback instructions 314 to cause the 3D printing management service 108 to quantify discrepancies between resource expenditure and update elements of client device-based user interfaces or print cell manager instructions.

The machine learning capabilities may include a machine learning system configured to predict success or failure of a print based, at least in part, on a type of material selected and one or more parameters of the print job, such as a 3D model of the item to be printed. Training datasets used to train the machine learning model may include data from a plurality of previous prints, the training datasets including inputs comprising one or more parameters of the print job, such as a 3D model of the print job defined by a coordinate matrix, and a material used in the print job and outputs comprising whether the print job was identified as a success or failure. When a print request is received, the analytics feedback instructions 314 may be executed to identify a probability of success of the print job based on one or more materials. For example, the 3D printing management service 108 may compute a probability of success for a selected material and/or for a plurality of different materials. The 3D printing management service 108 may provide an interface depicting a likelihood of success of the print with one or more different materials and/or may generate recommendations for different materials based on the probabilities of success.

The printer management instructions 114 may comprise print staging instructions 316. In various embodiments, print staging instructions 316 are instructions which, when executed by a computing device, cause the computing device to prepare 3D printing devices to begin and finish print operations. For example, the print staging instructions 316 may be executed to cause the 3D printing management service 108 to send instructions to a 3D printer to cause the 3D printer to heat a 3D printer's nozzle or print bed to a specified temperature or otherwise prepare the 3D printing device to best accommodate a printing job.

The printer management instructions 114 may comprise results tracking instructions 318. In various embodiments, results tracking instructions 318 are instructions which, when executed by a computing device, cause the computing device to generate metrics and quantities of resource expenditure as measured at a printing device. For example, an internal chronometer installed at a 3D printing device may detect an actual elapsed time or amount of material used to complete a printing job and relay that information to the 3D printing management service 108.

The printer management instructions 114 may comprise print fulfillment instructions 320. In various embodiments, print fulfillment instructions 320 are instructions which, when executed by a computing device, cause the computing device to specify actions or processes needed to fulfill the completion of a printing job. For example, 3D printing management service 108 may execute print fulfillment instructions 320 to cause 3D printing management service 108 to generate one or more sets of text instructions to aid a print cell manager in finishing a print job. As a further example, the print fulfillment instructions 320 may be executed to cause the 3D printing management service 108 to provide step-by-step instructions for curing an SLA print with proper chemicals subsequent to the corresponding SLA 3D printing device completing the print job.

The printer management instructions 114 may comprise return on investment (ROI) tracking instructions 322. In various embodiments, ROI tracking instructions 322 are instructions which, when executed by a computing device, cause the computing device to detect and quantify a rate of resource expenditure relative to another resource expenditure. For example, the 3D printing management service 108 may execute ROI tracking instructions 322 to cause the 3D printing management service 108 to determine a total amount of material used in a printing job and compare that amount to a monetary cost of procuring the resource to determine a return on investment of using the resource in a particular printing device. In a further example, ROI tracking instructions 322, when executed, cause the 3D printing management service 108 to compare a total time expended to complete a job by a first 3D printing device with a second 3D printing device that has completed a similar job to determine the difference between time investments in utilizing the printers.

3. Example Processes for 3D Printer Management

Figure 4:
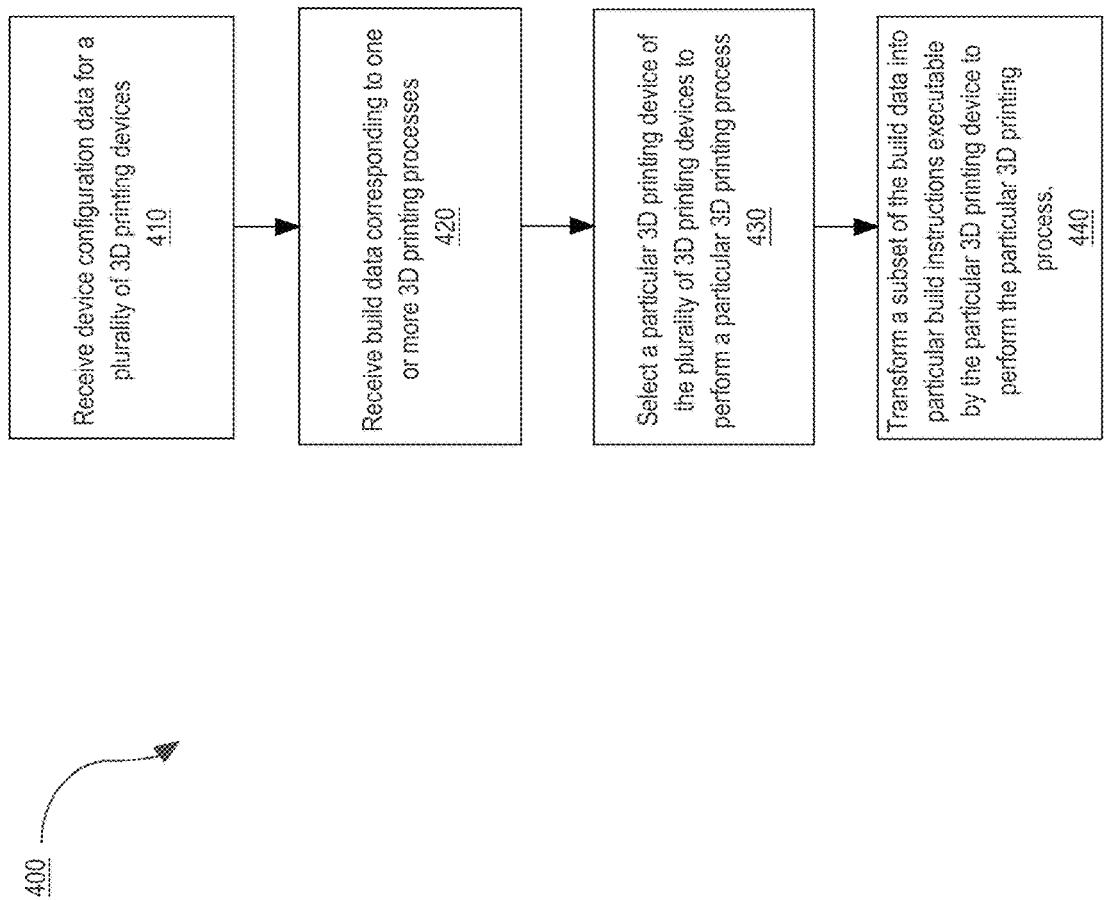
FIG. 4 depicts an example 3D printing management process.

FIG. 4 depicts an example 3D printing management process. FIG. 4 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The example process 400 depicted in FIG. 4 represents a process for facilitating a 3D printing management service. The 3D printing management service receives data relating to one or more requested jobs and data relating to one or more available printing devices to complete the jobs. Based on the data received, the 3D printing management service will select one or more printers to complete one or more jobs and will transform the received data to begin the 3D printing process.

The process starts at step 410 by receiving device configuration data for a plurality of 3D printing devices. The configuration data may be any data in any format necessary to convey relevant information for facilitating the processes described herein. In various embodiments, the configuration data includes the names of one or more 3D printing devices available for 3D printing jobs. In various embodiments, the configuration data includes configurations and physical limitations of one or more 3D printers communicatively coupled to a 3D printing management service. In various further embodiments, the configuration data includes parameter thresholds unique to one or more printers, such as build volume, material tolerances, microcontroller programming languages, or any other relevant information. For example, a 3D printing management service may receive configuration information containing unique identifiers for a number of coupled printers that correspond to a commercial manufacturer of the printer. The 3D printing management service may then use a lookup table to determine the physical constraints of each printer in a print cell according to the manufacturer's guidelines for each printer.

At step 420, the process includes receiving build data corresponding to one or more 3D printing processes. The build data may be any data in any format necessary to convey relevant information for facilitating the processes described herein. In various embodiments, the build data includes computer code in a stereolithography (.stl) or object format (.obj). In various embodiments, the build data includes computer code in a computer numerical control (CNC) format that is executable by one or more 3D printing devices. In various further embodiments, the build data includes metadata or supplementary data according to one or more client-defined configurations for a print job. For example, a 3D printing management service may receive build information comprising a computer code in the .stl format as well as metadata indicating various properties of an object such as a build material, color, support-enabling Boolean value, etc. The 3D printing management service may then use an internal slicing software to transform the received build data into executable code suitable for a particular 3D printing device.

In an embodiment, the 3D printing management service is configured to decrypt encrypted data received at the 3D printing management service and/or encrypt build data prior to sending the build data to one or more printing devices. An application executing on a client device may be configured to encrypt build data prior to sending the build data to the 3D printing management service. The one or more 3D printing devices may be configured to decrypt build instructions prior to executing the build instructions. By encrypting and decrypting the build data at the different end points, the process protects proprietary build data while performing the 3D management processes described herein.

At step 430, the process includes selecting a particular 3D printing device of the plurality of 3D printing devices to perform a particular 3D printing process. In various embodiments, selecting a particular 3D printing device includes selecting, based on the device configuration data and the build data, at least a particular 3D printing device of the plurality of 3D printing devices to perform a particular 3D printing process of the one or more 3D printing processes. For example, the 3D printing management service may utilize the configuration data and the build data to match a particular 3D printing job to a particular 3D printing device that is most suitable to perform the 3D printing job. As a further example, the 3D printing management service may determine one or more configuration parameters of a particular printer specified in the configuration data that is most suitable for performing the actions associated with the print job. In various embodiments, the 3D printing management service utilizes load balancing to select the particular 3D printing device based on a total and/or individual resource load of each 3D printer specified in the configuration information.

In various embodiments, selecting a particular 3D printer to perform a particular print job is based on a multi-step process of filtering. For example, the 3D printing management service may first consider all 3D printing devices known from the configuration data. The 3D printing management service may then filter out of the list all 3D printing devices that have a configuration that is not acceptable to the configurations of the build data. For example, when a print job specified that an object must be made from nylon material, the 3D printing management service first filters all 3D printing devices that are not compatible with nylon material from the selection process. The 3D printing management service may then filter out all 3D printing devices that are not currently coupled to a nylon material, even though they are capable of accepting it. Finally, the 3D printing management service may select from the remaining printers based on a load balancing procedure that selects a particular printer from the remaining printers in a manner that keeps the overall resource utilization of the print cell at a lowest possible level.

At step 440, the process includes transforming a subset of the build data into particular build instructions executable by the particular 3D printing device to perform the particular 3D printing process. In various embodiments, transforming a subset of the build data includes transforming a subset of the build data into particular build instructions for the particular 3D printing device, the particular build instructions being executable by the particular 3D printing device to perform at least the particular 3D printing process. In various embodiments, transforming the build data includes transforming the build data received in step 420 into machine-executable code for one or more particular 3D printers. For example, after determining the particular 3D printer in step 430, the 3D printing management service may determine a preferred format of machine-readable code for that particular 3D printer. The 3D printing management service may then transform the build data into machine-executable code that is most efficiently read by the particular selected 3D printing device. The machine-executable code corresponds to a series of physical moves or actions by the particular 3D printing device to manufacture a physical 3D object in accordance with the print job corresponding to the build data received in step 420.

Figure 5:
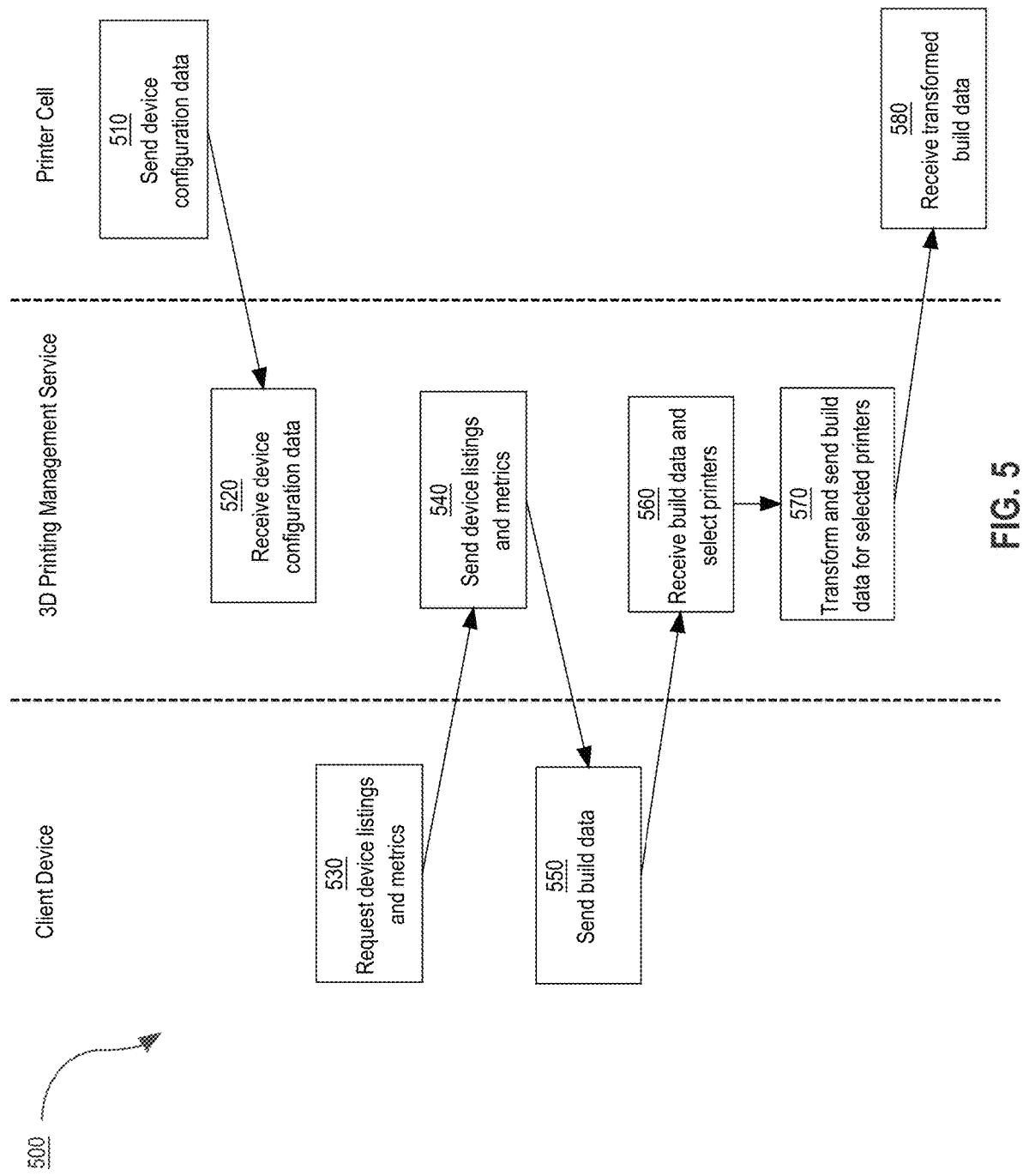
FIG. 5 depicts an example 3D printing management system.

FIG. 5 depicts an example 3D printing management system. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

The example system 500 depicted in FIG. 5 represents a system for facilitating a 3D printing management service by executing a process on the system. The system utilizes at least a client device, such as client device 120, a 3D printing management service, such as the 3D printing management service 108, and a print cell including one or more printers, such as the 3D printer 106. The process beings at step 510 by sending device configuration data from the print cell to the 3D printing management service. The configuration data may contain any relevant information regarding the 3D printing device or print cell and the configuration thereof.

At step 520, the system operates by receiving device configuration data at the 3D printing management service. At step 530, the system operates by requesting device listings and metrics, by the client device, from the 3D printing management service. This request may take any form or configuration relevant to the management of 3D printing jobs. For example, the client device may request device listings from the 3D printing management service which are obtained from the received configuration data in response to uploading object data to be transformed into build data at the client device.

At step 540, the system operates by sending device listings and metrics from the 3D printing management service to the client device. These may be data representing the 3D printing devices obtained from the device configuration data received in step 520. At step 550, the system operates by sending build data, from the client device, to the 3D printing management service. The build data may include any data necessary to convey the configuration of a potential physical 3D printed object that will be the subject of a print job. In various embodiments, the build data includes a selection of one or more printers from the device listings sent in step 540.

At step 560, the system operates by receiving build data at the 3D printing management service and selecting the printers to perform the printing operation. In various embodiments, when metadata indicating a selection of a particular 3D printer, by the client device, to perform the printing job is received, the selection of the printer is made in a corresponding manner by the 3D printing management service. At step 570, the system operates by transforming, by the 3D printing management service, the build data according to the selected printers and sending the transformed build data to the print cell. For example, the 3D printing management service may transform the build data received in step 560 to an executable code in a form corresponding to a code language associated with the selected printer in step 560. At step 580, the system operates by receiving, by the print cell, the transformed build data. In various embodiments, the print cell will communicate with the selected printer in response to receiving the transformed build data. In various further embodiments, the transformed build data will be executed on the particular selected 3D printing device in response to receiving the transformed build data.

4. Example Embodiments

4.1. Client Interfaces

Figure 6:
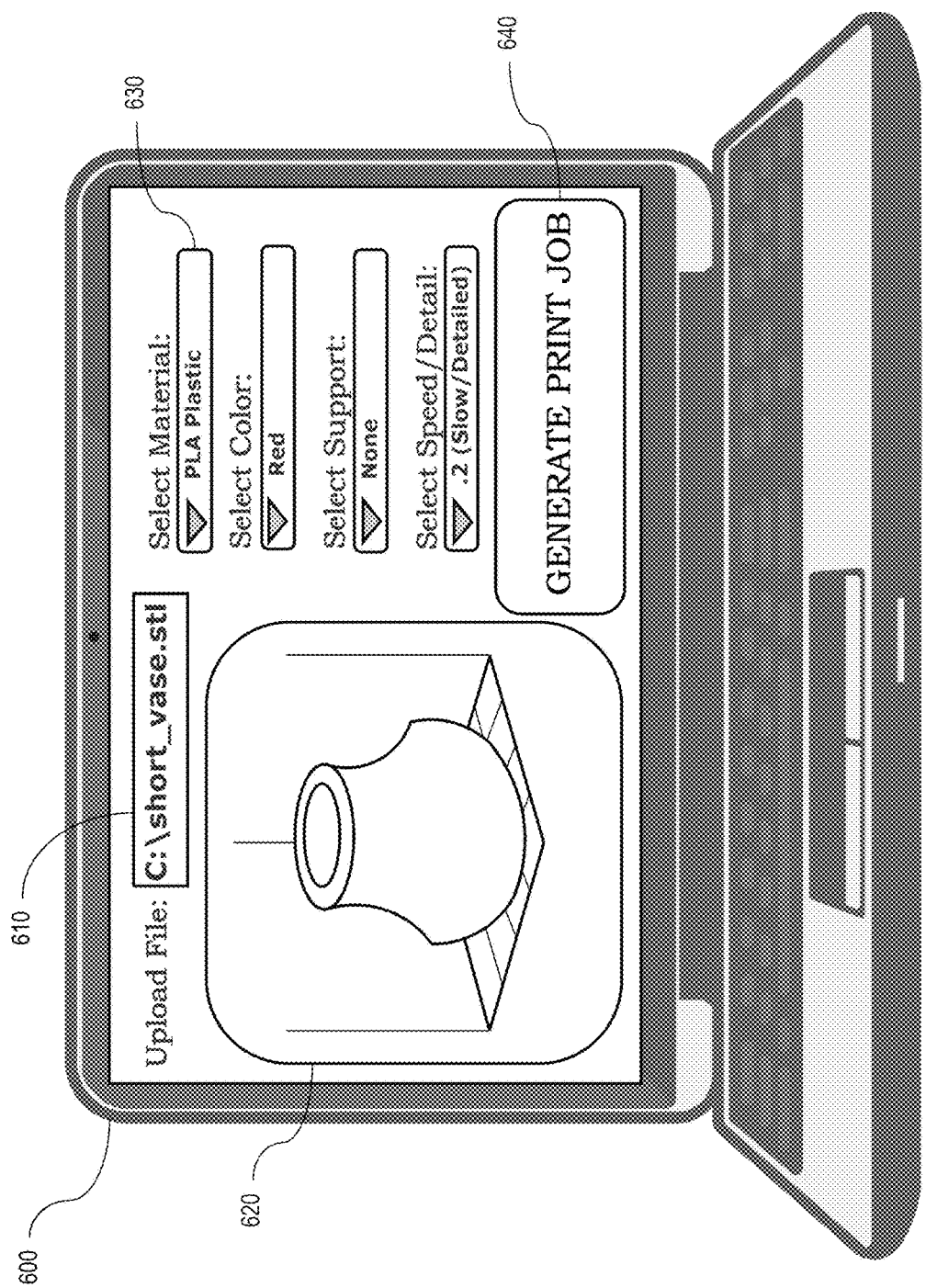
FIG. 6 depicts an example 3D printing interface.

One or more interfaces or input environments may be made available to a client device as part of facilitating a 3D printing process. FIG. 6 depicts an example 3D printing interface. As depicted in FIG. 6, a client device 600 may be used as a medium to facilitate part of a 3D printing management process such as the processes described herein. Client device 600 includes a screen on which client users may interact with a web or cloud-based portal for requesting 3D printing jobs. The interface depicted in FIG. 6 includes a file upload field 610. The file upload field 610 may be a field into which a client may input a representation of a digital object which is sought to be 3D printed as a physical manufactured object by a print cell. As depicted in FIG. 6, the file upload field 610 is displayed next to a prompt on the interface specifying to "UPLOAD FILE:" The file upload field 610 in FIG. 6 is displayed as comprising a file path to a .stl file that represents the object to be 3D printed.

The interface depicted in FIG. 6 further includes an object view window 620. In various embodiments, the object view window 620 is displayed as part of the web or cloud-based portal for rendering a digital representation of a physical object according to a predicted manufacturing process. As depicted in FIG. 6, the file uploaded in the file upload field 610 has been rendered in object view window 620 as a quasi-3D object that can be viewed by a user of the interface. In various embodiments, the 3D printing management service facilitating the interface will automatically render or slice the rendered image to provide a view to a user of the client device 600 corresponding to the predicted manufactured state of the object. For example, FIG. 6 depicts a "short vase" in a virtual environment according to the expected view of a corresponding manufactured object according to a view shown by the object view window 620.

The interface depicted in FIG. 6 includes one or more printing configuration fields 630. The printing configuration fields 630 represent one or more configurations selectable by a user of the interface prior to generating the 3D print job request. As depicted in FIG. 6, the printing configuration fields are shown as drop-down menus from which a finite number of configurations and parameters may be specified. For example the printing configuration field below the text "SELECT MATERIAL" corresponds to a material that will be used to build the manufactured 3D object, and is currently set to "Polylactic Acid Plastic" or "PLA Plastic," specifying that that is the desired material for print job use.

Also depicted in FIG. 6 are other printing configuration fields 630 corresponding to prompts for "SELECT COLOR," "SELECT SUPPORT," and "SELECT SPEED/DETAIL," and display corresponding menu selections of "RED," "NONE," and "0.2 (SLOW/DETAILED) respectively. This configuration depicted in FIG. 6 corresponds to manufacturing the "short vase" as a plastic, red vase with no support material and a moderate level of print resolution detail. The interface depicted in FIG. 6 further includes a print initiation button 640. In various embodiments, user selection of the print initiation button 640 on the interface will send build data to the 3D printing management service in accordance with steps 420 of example process 400 and/or step 550 of example system 500.

Figure 7:
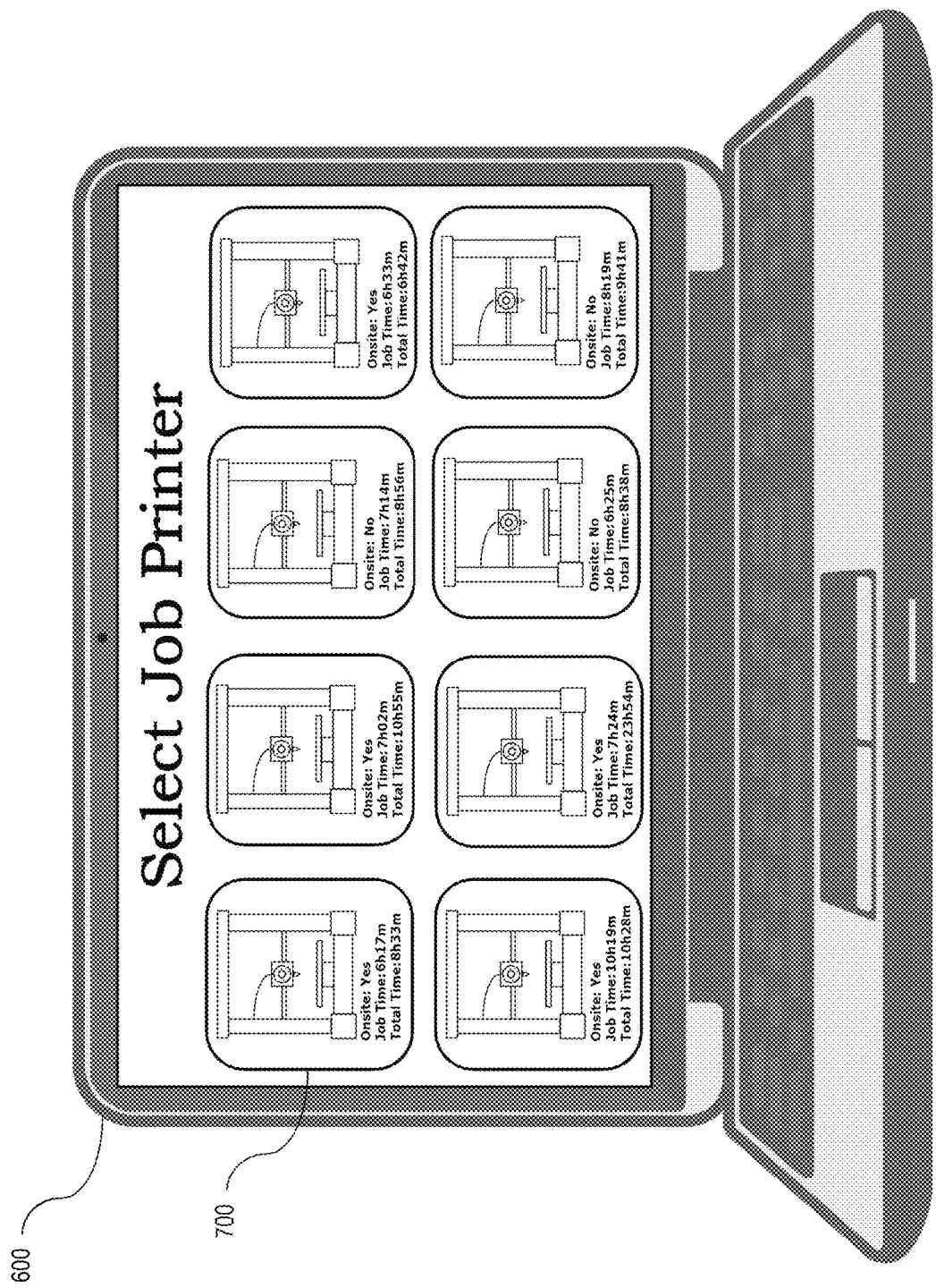
FIG. 7 depicts an example 3D printing interface.

In some cases, the web or cloud-based interface generated by a 3D printing management system may allow a user to specify a particular printer from a print cell to which the printing job may be sent. FIG. 7 depicts an example 3D printing interface. As depicted in FIG. 7, a client device such as the client device 600 may be used as a medium to further facilitate part of the 3D printing management processes described herein. The client device 600 includes a screen on which client users may interact with a web or cloud-based portal for requesting 3D printing jobs. The interface depicted in FIG. 6 includes one or more printer selection buttons 700. In various embodiments, one or more printer selection buttons may be displayed in an interface in response to beginning a print job request or interacting with print initiation button 640.

User selection of a printer allows great client control in setting a time period or expected outcome of a print job. For example, FIG. 7 depicts a number of printer selection buttons 700 below a prompt "SELECT JOB PRINTER." A user of the interface may select a printer that best suits their needs for a particular job. In various embodiments, configuration information such as the data received in step 410 of example process 400 or step 520 of example system 500 may be used to convey printer status information to a user. For example, each of the printer selection buttons 700 contains a picture of a corresponding printer to which a job may be sent. The button also includes one or more metrics such as the location of a printer, the time resources expended to manufacture an object, and the total time resources expended between the time the job request is generated and the object is manufactured.

For example, the upper left printer selection button depicted in FIG. 7 contains a picture of the 3D printing device as well field information indicating "ONSITE: YES," "JOB TIME: 6 h17 m," and "TOTAL TIME: 8 h33 m." The field corresponds to an indication that the printer is operating on the client's physical site, the time for the printer to complete the job will be 6 hours and 17 minutes, and the time before the manufactured part may be ready for the client is 8 hours and 33 minutes. Discrepancies between the "job time" and the "total time" may be attributed to multiple factors inherent to the 3D printing devices, such as cooldown time between print jobs, print jobs currently active or queued for the 3D printing device, and/or expected downtime for maintenance, among other factors.

4.2. Preset Configurations

In various embodiments, the 3D printing management service maintains one or more present configurations for build data or printer data. For example, the 3D printing management service may store or determine one or more configurations for data or print jobs being facilitated according to the embodiments described herein. The 3D printing management service may receive these present configurations or determine them based on information stored within the system. For example, the 3D printing management service may associate a particular preset printing configuration with a particular client device or user of a client device. For example, a hospital may require all 3D prints requested at a grafting room client device to be made from flexible nylon in order to interact safely with human skin. The 3D printing management service may determine that a print job in being requested from that device and utilize a present configuration of black nylon filament to be utilized for a job automatically.

In various embodiments, the present configurations may be based on individual printers in a print cell. For example, an operator may determine that a particular printer experiences "layer drift," a skewing of 3D printing layers based on an imperfection in the moving parts of a printer, when the printer manufactures objects larger than 200 millimeters in diameter. As a result, all jobs sent to this particular printer will be automatically filtered to only include jobs for manufacturing objects having a diameter within this ranger.

In various embodiments, the present configurations may be inherent to the 3D printing management service. For example, the 3D printing management service may determine that all materials made from PLA take a shorter amount of time to manufacture than an object made from alternative materials. As a result, during extreme load periods, periods of time in which a print cell is highly active, the 3D printing management service may automatically determine that all objects will be manufactured in PLA plastic unless otherwise specified.

4.3. Job Management

According to various embodiments, the 3D printing management service performs one or more actions during the facilitation of print jobs to utilize print resources more efficiently or prevent lags in resource utilization. In various embodiments, the 3D printing management service may maintain a queue of print jobs that will be sent to the print cell. The 3D printing management service may order the queue of print jobs according to total resource requirement, client payment considerations, or material requirements/print difficulty. The jobs stored in the queue may be parsed by the 3D printing management service and sent to a print cell in an order determined by the 3D printing management service to maximize productivity or the print cell and outcomes for the requesting entities.

In various embodiments, the 3D printing management service maintains a machine vision module or entity that tracks the progress of printed objects before, during, and after the manufacturing of the object. For example, a machine vision module coupled to an individual 3D printer device may automatically and periodically send visual or geolocation data to the 3D printing management service to compare to an expected outcome for the print job. The 3D printing management service may then use the comparison to make changes to the print job in real time, including changing the parameters of operation for the 3D printing device, summoning an operator for alter the physical composition of the device or cancelling the print job altogether.

In various embodiments, the 3D printing management service splits a print job into two or more print jobs to facilitate more efficient utilization of the resources for a print cell. For example, the 3D printing management service may determine that a particular print job will require 4 hours of resource time to complete and that daily expected resource expenditures will peak in two hours. The 3D printing management service may then split the print job into two separate print jobs of 2 hours each and send an instruction to an operator to combine the two printed objects when the manufacturing is complete. This will allow the object to be manufactured in time for the two printers to be available for peak expected resource load periods. In various embodiments, the 3D printing management service will automatically split objects that are too large for a single printer in the print cell into two or more pieces to be combined in this manner.

4.4. Printer Maintenance

Figure 8:
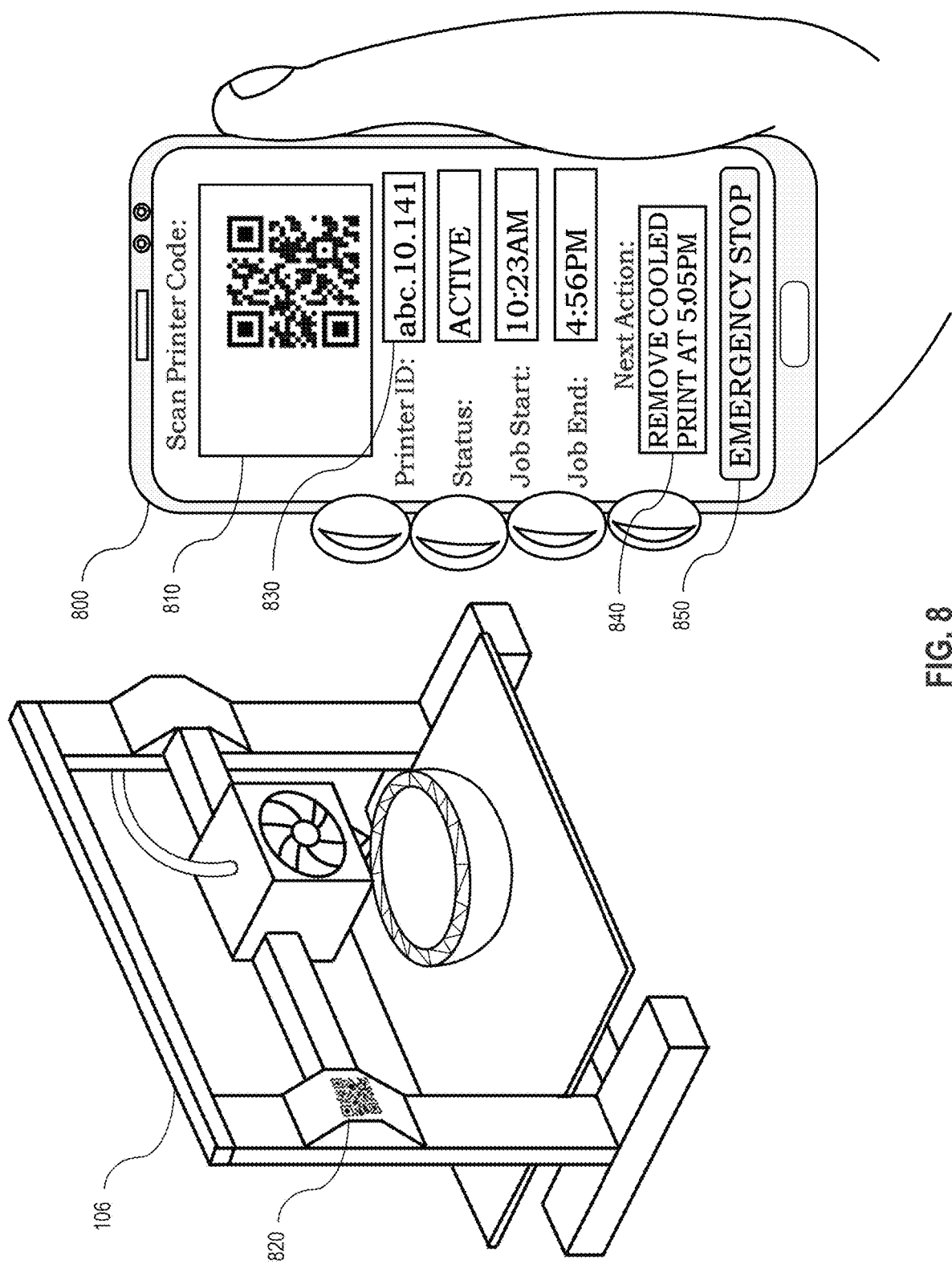
FIG. 8 depicts an example 3D printing interface.

In various embodiments, a 3D printing device or print cell may be managed by a device or human worker in order to facilitate printing jobs. These interactions may be further monitored and altered according to the 3D printing management service. FIG. 8 depicts an example 3D printing interface. As depicted in FIG. 8, a 3D printer such as 3D printer 106 may be managed by an operator. An operator may use a device such as the mobile device 800 to manage the 3D printer 106. The mobile device 800 includes a screen on which an operator may interact with a web or cloud-based portal for managing 3D printing jobs. The mobile device 800 may be coupled to a 3D printing management service to enable efficient interaction with the 3D printer 106. The mobile device 800 includes a scannable code window 810. The scannable window 810 may be any window, widget, element, field or other entity that enables an operator to interact with a 3D printing device. For example, the 3D printer 106 includes identification code 820 as depicted in FIG. 8. The identification code 820 may be any identifier, physical or digital, which allows an operator to identify a 3D printing device. For example, as depicted in FIG. 8, the identification code 820 is a QUICK RESPONSE CODE (QR Code) that allows an operator to scan the code utilizing scannable code window 810.

Once the 3D printer 106 has been identified or in response to the 3D printing management service indicating to an operation that an action must be taken, an operator may receive some indication of the status of the 3D printer. The mobile device 800 includes one or more identification fields 730. The identification fields 730 include information that allows an operator to review and manage a 3D printer in real time. For example, as depicted in FIG. 8, the mobile device 800 includes multiple identifiers and fields corresponding to information about the 3D printer 106. These include a "PRINTER ID:" corresponding to a field of "abc.10.141," indication a serial or id sequence to the 3D printer. The identification fields also include "STATUS:" set to "ACTIVE" to indicate that the printer is currently performing a job, and "JOB START:" AND "JOB END:" fields corresponding to the expected or actual start and end times for the job.

The identification fields 730 also include a "NEXT ACTION:" field indicating a next action that will be taken by the operators to complete or continue the 3D print job at 3D printer 106. As depicted in FIG. 8, this action is "REMOVE COOLED PRINT AT 5:05 PM." This indicates that the operator should remove the printed object at that time to complete the print job. The mobile device 800 also includes instruction window 840. The mobile device 800 includes an emergency stop button 850. In various embodiments, the operator may interact with the emergency stop button 850 to immediately stop the printing process in case of a failed print or a serious defect with the 3D printer.

4.5. Resource Load Balancing

In various embodiments, the 3D printing management service facilitates resource load balancing to select one or more 3D printing devices for a print job. In various embodiments, the 3D printing management service will analyze, parse, and quantify resource loads of a print cell and determine one or more printers most suitable for completing a print job. For example, the 3D printing management service may quantify a number of factors of resource utilization for a 3D printing device to determine that the particular 3D printing device can perform a print job while increasing the total resource utilization of the print cell by the least amount possible in order to prepare for future jobs. An equation for load balancing may be as follows:

$$U_A = (R_A)/(R_A + R_B + R_C + \ldots)$$

where $R_A$ is the resource utilization of individual printer A, $(R_A + R_B + R_C + \ldots)$ is the total resource utilization of all printers in the cell, and $U_A$ is the relative utilization of individual printer A compared to the print cell. $R_A$ may be determined based on a number of factors of resources such as time resources, material resources, electricity resources, etc.

These factors may also be balanced by a relative importance metric for each printer that corresponds to a printer's overall value to the print cell. This may be useful if certain printers perform more efficiently than other printers in the print cell. An equation for resource utilization may be as follows:

$$R_A = (T_A \pm M_A \pm E_A)/(EI*Sf)$$

where $R_A$ is the resource utilization of the individual printer A, $T_A$ is a quantification of the time resources being used by the individual printer A, $M_A$ is a quantification of the material resources being used by the individual printer A, $E_A$ is a quantification of the electricity resources being used by the individual printer A, EI is the efficiency index of the printer as measured on a scale of 1-10, and Sf is the scaling factor of the relative importance of the efficiency index according to a print cell's needs. Individual printer A will be selected if it has the lowest relative utilization ($U_A$) among all the printers in the print cell ($U_A$, $U_B$, $U_C$, ...). It will be appreciated by one having ordinary skill in the art that these are simply examples of mays that load balancing may be performed and not the only embodiments applicable to a 3D printing management service.

4.6. Supply Chain Integration

In various embodiments, the 3D printing management service integrates supply chain metrics and actions in the processes described herein. For example, the 3D printing management service may automatically recognize patterns in resource expenditure and take reactive action in the supply chain to remedy potential problems. These remedies may include procurement of additional resources. For example, the 3D printing management service may track a total amount of PLA plastic currently in use by a print farm. This amount may include both plastics in current use by 3D printing devices as well as plastics in storage. The 3D printing management service may then order, or send a request to an operator to order, from the supply chain, an additional amount of PLA plastic to meet expected resource expenditures over a future period of time. In other various embodiments, a 3D printing management service may determine that resource expenditure is expected to increase above a threshold not manageable by a single human operator on-site. The 3D printing management service may automatically send a request to a second operator to join the first operator on site to aid in the facilitation of print jobs.

4.7. Digital Warehousing

In an embodiment, the 3D printing management service stores data defining previous builds. The data may include the initial build data identifying the item to be built, identification of a number of items built, identification of printers used to print the item, identification of usage of the item, such as machinery or other items in which the printed item was used as a component, identification of build materials for the item, and any other metrics relating to the building of the item. In an embodiment, the 3D printing management service may additionally cause printing of an extra copy of the item at a different location. For example, the 3D printing management service may cause printing of requested items at a customer location and may cause printing of a copy of each item at a location central to the 3D printing management service. By printing the additional copy of the item, the 3D printing management service allows for customer support wherein a representative at the central location can review a printed output to ensure successful printing, identify defects, or otherwise provide additional support relating to the printed item.

In an embodiment, the 3D printing management service provides the previous build data to a client device. For example, a client device may send a request for one or more previous builds to the 3D printing management service. The 3D printing management service may provide, through a graphical user interface, information relating to previously printed items for the client device, thereby allowing the client device to reprint previously printed items, adjust parameters of the previously printed items, or otherwise review information relating to the previously printed items. The digital warehousing thus allows for easy adjustments to previously printed items and immediate reprinting of the items with the adjustments. Additionally, the digital warehousing allows a client device to access print information for a previously printed item, thereby providing functionality for a comparison of a printed item with the set parameters for printing the item.

In an embodiment, the digital warehousing may also be used to perform item tracking. For example, the 3D printing management service may identify each item that used a particular print build as a component. Thus, if a particular printed component was faulty because of material, design, or other factors, the stored data may be used to identify each manufactured item that used the particular printed component, thereby providing functionality for easy removal and replacement of parts.

5. Hardware, Software and Cloud Computing Examples

5.1. Hardware Example

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
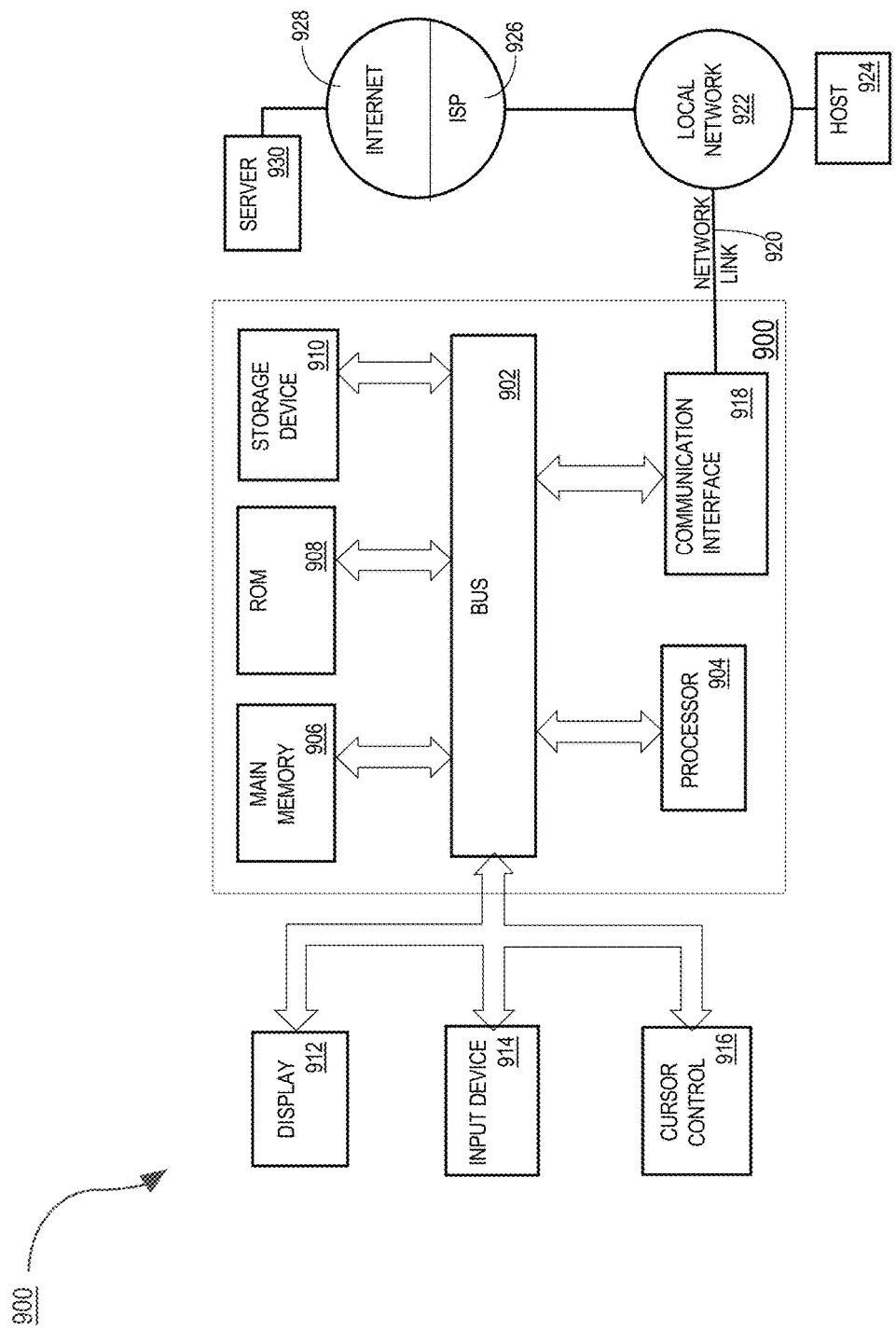
FIG. 9 is a block diagram that depicts a computer system upon which various embodiments may be implemented.

For example, FIG. 9 is a block diagram that depicts a computer system 900 upon which various embodiments may be implemented. the computer system 900 includes a bus 902 or other communication mechanism for communicating information, and a hardware processor 904 coupled with bus 902 for processing information. The hardware processor 904 may be, for example, a general-purpose microprocessor.

The computer system 900 also includes a main memory 906, such as a random-access memory (RAM) or other dynamic storage device, coupled to the bus 902 for storing information and instructions to be executed by the hardware processor 904. The main memory 906 also may be used for storing temporary variables or other intermediate information during execution of instructions to be executed by the hardware processor 904. Such instructions, when stored in non-transitory storage media accessible to the hardware processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the hardware processor 904. A storage device 910, such as a magnetic disk, optical disk, or solid-state drive is provided and coupled to the bus 902 for storing information and instructions.

The computer system 900 may be coupled via the bus 902 to a display 912, such as a cathode ray tube (CRT), for displaying information to a computer user. An input device 914, including alphanumeric and other keys, is coupled to the bus 902 for communicating information and command selections to the hardware processor 904. Another type of user input device is cursor control 916, such as a mouse, a trackball, or cursor direction keys for communicating direction information and command selections to the hardware processor 904 and for controlling cursor movement on display 912. This input device typically has two degrees of freedom in two axes, a first axis (e.g., x) and a second axis (e.g., y), that allows the device to specify positions in a plane.

The computer system 900 may implement the techniques described herein using customized hard-wired logic, one or more ASICs or FPGAs, firmware and/or program logic which in combination with the computer system causes or programs the computer system 900 to be a special-purpose machine. According to one embodiment, the techniques herein are performed by the computer system 900 in response to the hardware processor 904 executing one or more sequences of one or more instructions contained in the main memory 906. Such instructions may be read into the main memory 906 from another storage medium, such as the storage device 910. Execution of the sequences of instructions contained in the main memory 906 causes the hardware processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical disks, magnetic disks, or solid-state drives, such as the storage device 910. Non-volatile media may also include persistent memory, such as MRAM or PCM, like 3DXPoint from Intel which can be used as a part of main memory. Volatile media includes dynamic memory, such as the main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 902. Transmission media can also take the form of acoustic or light waves, such as those generated during radio-wave and infra-red data communications.

Various forms of media may be involved in carrying one or more sequences of one or more instructions to the hardware processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the bus 902. The bus 902 carries the data to the main memory 906, from which the hardware processor 904 retrieves and executes the instructions. The instructions received by the main memory 906 may optionally be stored on the storage device 910 either before or after execution by the hardware processor 904.

The computer system 900 also includes a communication interface 918 coupled to bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

The network link 920 typically provides data communication through one or more networks to other data devices. For example, the network link 920 may provide a connection through local network 922 to a host computer 924 or to data equipment operated by an Internet Service Provider (ISP) 926. The ISP 926 in turn provides data communication services through the worldwide packet data communication network now commonly referred to as the "Internet" 928. The local network 922 and the Internet 928 both use electrical, electromagnetic or optical signals that carry digital data streams. The signals through the various networks and the signals on network link 920 and through communication interface 918, which carry the digital data to and from computer system 900, are example forms of transmission media.

The computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by the hardware processor 904 as it is received, and/or stored in the storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.2. Software Example

Figure 10:
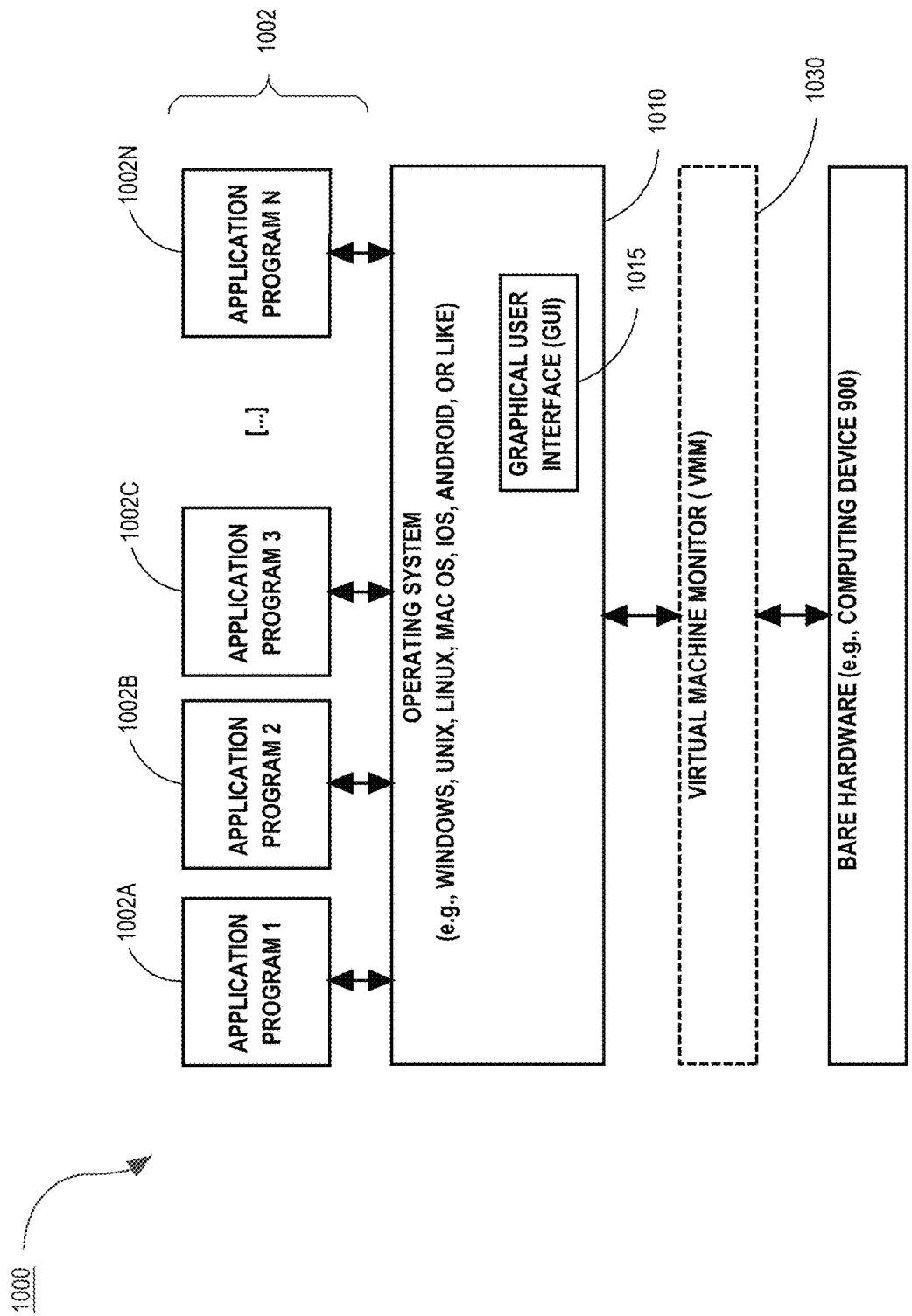
FIG. 10 is a block diagram of a software system that may be employed for controlling the operation of computer systems.

FIG. 10 is a block diagram of a software system 1000 that may be employed for controlling the operation of the computer system 900. The software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

The software system 1000 is provided for directing the operation of the example system 500. The software system 1000, which may be stored in system memory (RAM) and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage into memory) for execution by the system. The applications or other software intended for use on the system may also be stored as a set of downloadable computer-executable instructions, for example, for downloading and installation from an Internet location (e.g., a Web server, an app store, or other online service).

The software system 1000 includes a graphical user interface (GUI) 1015, for receiving user commands and data in a graphical (e.g., "point-and-click" or "touch gesture") fashion. These inputs, in turn, may be acted upon by the computer system 900 in accordance with instructions from the operating system 1010 and/or application(s) 1002. The GUI 1015 also serves to display the results of operation from the OS 1010 and the application(s) 1002, whereupon the user may supply additional inputs or terminate the session (e.g., log off).

The OS 1010 can execute directly on bare hardware (e.g., processor(s)) utilizing the software system 1000. Alternatively, a hypervisor or virtual machine monitor (VMM) 1030 may be interposed between the bare hardware and the OS 1010. In this configuration, the VMM 1030 acts as a software "cushion" or virtualization layer between the OS 1010 and the bare hardware of the system.

The VMM 1030 instantiates and runs one or more virtual machine instances ("guest machines"). Each guest machine includes a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware of a system directly. In these instances, the same version of the guest operating system configured to execute on the bare hardware directly may also execute on the VMM 1030 without modification or reconfiguration. In other words, the VMM 1030 may provide full hardware and CPU virtualization to a guest operating system in some instances.

In other instances, a guest operating system may be specially designed or configured to execute on the VMM 1030 for efficiency. In these instances, the guest operating system is "aware" that it executes on a virtual machine monitor. In other words, the VMM 1030 may provide para-virtualization to a guest operating system in some instances.

The above-described basic computer hardware and software is presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

5.3. Cloud Computing Example

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud includes two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The invention claimed is:

1. A computer-implemented method comprising:
   receiving device configuration data for a plurality of 3D printing devices;
   receiving build data corresponding to one or more 3D printing processes;
   selecting, based on the device configuration data and the build data, at least a particular 3D printing device of the plurality of 3D printing devices to perform a particular 3D printing process of the one or more 3D printing processes;
   transforming a subset of the build data into particular build instructions for the particular 3D printing device, the particular build instructions executable by the particular 3D printing device to perform at least the particular 3D printing process.

2. The computer-implemented method of claim 1 further comprising causing executing, by the particular 3D printing device, the particular build instructions to perform the particular 3D printing process, the particular 3D printing process comprising 3D printing a particular object.

3. The computer-implemented method of claim 1 wherein selecting at least the particular 3D printing device comprises:
   identifying a current resource load of the particular 3D printing device and a current resource load of one or more other 3D printing devices;
   determining that the current resource load of the particular 3D printing device is lower than the current resource load of the one or more other 3D printing devices and, in response, selecting the particular 3D printing device.

4. The computer-implemented method of claim 1 further comprising:
   monitoring the one or more 3D printing processes;
   generating, during pendency of the one or more 3D printing processes, 3D printing process data;
   providing, to one or more computing devices, the generated 3D printing process data.

5. The computer-implemented method of claim 1 further comprising:
   providing, to one or more computing devices, device data based on the device configuration data;
   generating and displaying, to the one or more computing devices and based on the provided device data, resource consumption data, the resource consumption data corresponding to an expected resource expenditure of performing the one or more 3D printing processes on the plurality of 3D printing devices.

6. The computer-implemented method of claim 1 wherein:
   receiving the build data comprises:
      receiving a request from a client computing device to perform the particular 3D printing process;
      identifying one or more 3D printing devices of the plurality of 3D printing devices capable of performing the particular 3D printing process;
      sending data relating to the identified one or more 3D printing devices to the client computing device;
   selecting, at least the particular 3D printing device comprises receiving, from the client computing device, a selection of the particular 3D printing device.

7. The computer-implemented method of claim 1 wherein:
   the device configuration data is received by a 3D printing service over a network from one or more 3D printer management devices, the one or more 3D printer management devices communicatively coupled to the one or more 3D printing devices;
   the build data is received by the 3D printing service over a network from one or more client computing devices;
   determining the particular 3D printing device and transforming the subset of the build data are performed by the 3D printing service.

8. The computer-implemented method of claim 1 wherein:
   the one or more 3D printing processes comprises at least the particular 3D printing process and a second 3D printing process;
   the particular 3D printing process corresponds to a particular print requirement and the second 3D printing process corresponds to a second print requirement;

selecting at least the particular 3D printing device comprises selecting a first 3D printing device of the plurality of 3D printing devices which meets the particular print requirement as the particular 3D printing device which will perform the particular 3D printing process; and the method further comprises selecting a second 3D printing device of the plurality of 3D printing devices which meets the second print requirement to perform the second 3D printing process.

9. The computer-implemented method of claim 8 wherein:

each 3D printing device of the plurality of 3D printing devices corresponds to a firmware configuration;

transforming the subset of the build data comprises transforming a strict subset of the build data corresponding to the particular 3D print process into particular build instructions in accordance with a particular firmware configuration of the particular 3D printing device;

the method further comprises transforming a second subset of the build data corresponding to the second 3D print process into second build instructions in accordance with a second firmware configuration of the second 3D printing device, the second firmware configuration being different than the particular firmware configuration.

10. The computer-implemented method of claim 1 wherein:

the build data corresponds a 3D printing process that, when executed, will 3D print a single object;

transforming a subset of the build data into particular build instructions comprises transforming a first subset of the build data into particular build instructions for performing a first portion of the particular 3D printing process at the particular 3D printing device and transforming a second subset of the build data into second build instructions for performing a second portion of the 3D printing process at a second 3D printing device.

11. The computer-implemented method of claim 1 further comprising generating, in response to determining the particular 3D printing device and based on the device configuration data, one or more user instructions for operating the particular 3D printing device.

12. One or more non-transitory computer-readable media storing instructions which, when executed by one or more processors, cause performance of:

receiving device configuration data for a plurality of 3D printing devices;

receiving build data corresponding to one or more 3D printing processes;

selecting, based on the device configuration data and the build data, at least a particular 3D printing device of the plurality of 3D printing devices to perform a particular 3D printing process of the one or more 3D printing processes;

transforming a subset of the build data into particular build instructions for the particular 3D printing device, the particular build instructions executable by the particular 3D printing device to perform at least the particular 3D printing process.

13. The one or more non-transitory computer-readable media of claim 12 further comprising instructions which, when executed, cause executing, by the particular 3D printing device, the particular build instructions to perform the particular 3D printing process, the particular 3D printing process comprising 3D printing a particular object.

14. The one or more non-transitory computer-readable media of claim 12 wherein selecting at least the particular 3D printing device comprises:

identifying a current resource load of the particular 3D printing device and a current resource load of one or more other 3D printing devices;

determining that the current resource load of the particular 3D printing device is lower than the current resource load of the one or more other 3D printing devices and, in response, selecting the particular 3D printing device.

15. The one or more non-transitory computer-readable media of claim 12 further comprising instructions which, when executed, cause:

monitoring the one or more 3D printing processes;

generating, during pendency of the one or more 3D printing processes, 3D printing process data;

providing, to one or more computing devices, the generated 3D printing process data.

16. The one or more non-transitory computer-readable media of claim 12 further comprising instructions which, when executed, cause:

providing, to one or more computing devices, device data based on the device configuration data;

generating and displaying, to the one or more computing devices and based on the provided device data, resource consumption data, the resource consumption data corresponding to an expected resource expenditure of performing the one or more 3D printing processes on the plurality of 3D printing devices.

17. The one or more non-transitory computer-readable media of claim 12 wherein receiving the build data comprises:

receiving a request from a client computing device to perform the particular 3D printing process;

identifying one or more 3D printing devices of the plurality of 3D printing devices capable of performing the particular 3D printing process;

sending data relating to the identified one or more 3D printing devices to the client computing device;

selecting, at least the particular 3D printing device comprises receiving, from the client computing device, a selection of the particular 3D printing device.

18. The one or more non-transitory computer-readable media of claim 12 wherein:

the one or more 3D printing processes comprises at least the particular 3D printing process and a second 3D printing process;

the particular 3D printing process corresponds to a particular print requirement and the second 3D printing process corresponds to a second print requirement;

selecting at least the particular 3D printing device comprises selecting a first 3D printing device of the plurality of 3D printing devices which meets the particular print requirement as the particular 3D printing device which will perform the particular 3D printing process; and the method further comprises selecting a second 3D printing device of the plurality of 3D printing devices which meets the second print requirement to perform the second 3D printing process.

19. The one or more non-transitory computer-readable media of claim 18 wherein:

each 3D printing device of the plurality of 3D printing devices corresponds to a firmware configuration;

transforming the subset of the build data comprises transforming a strict subset of the build data corresponding to the particular 3D print process into particular build instructions in accordance with a particular firmware configuration of the particular 3D printing device;

the method further comprises transforming a second subset of the build data corresponding to the second 3D print process into second build instructions in accordance with a second firmware configuration of the second 3D printing device, the second firmware configuration being different than the particular firmware configuration.

20. The one or more non-transitory computer-readable media of claim 12 wherein:

the build data corresponds a 3D printing process that, when executed, will 3D print a single object;

transforming a subset of the build data into particular build instructions comprises transforming a first subset of the build data into particular build instructions for performing a first portion of the particular 3D printing process at the particular 3D printing device and transforming a second subset of the build data into second build instructions for performing a second portion of the 3D printing process at a second 3D printing device.

* * * * *